US006970785B2

(12) United States Patent
Derambure et al.

(10) Patent No.: US 6,970,785 B2
(45) Date of Patent: Nov. 29, 2005

(54) DEVICE FOR A MOBILE TERMINAL FOR DETERMINING POSITION BY FILTERING INTEGRITY DATA FROM AN AUGMENTATION DEVICE

(75) Inventors: Xavier Derambure, Toulouse (FR); Philippe Roghi, Cugnaux (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/002,417

(22) Filed: Dec. 3, 2004

(65) Prior Publication Data
US 2005/0131636 A1    Jun. 16, 2005

(30) Foreign Application Priority Data
Dec. 16, 2003 (FR) ................................... 03 14700

(51) Int. Cl.⁷ .......................................... G01C 21/26
(52) U.S. Cl. ..................... 701/207; 701/213; 701/214; 342/357.06; 342/357.09; 342/357.02; 342/357.14
(58) Field of Search ................................. 701/200–220; 342/357.01–357.12

(56) References Cited
U.S. PATENT DOCUMENTS

| 5,504,492 | A |   | 4/1996  | Class et al. |
|-----------|---|---|---------|-----------------------------|
| 6,104,338 | A | * | 8/2000  | Krasner .................. 342/357.06 |
| 6,134,484 | A |   | 10/2000 | Geier et al. |
| 6,204,806 | B1 |  | 3/2001  | Hoech |
| 6,229,479 | B1 | * | 5/2001 | Kozlov et al. ......... 342/357.06 |
| 6,266,612 | B1 | * | 7/2001 | Dussell et al. .............. 701/207 |
| 6,411,254 | B1 | * | 6/2002 | Moeglein et al. ....... 342/357.01 |
| 6,411,899 | B2 | * | 6/2002 | Dussell et al. ............. 701/211 |
| 6,421,002 | B2 | * | 7/2002 | Krasner ................... 342/357.1 |
| 6,466,846 | B2 |  | 10/2002 | Maynard |
| 6,677,894 | B2 | * | 1/2004 | Sheynblat et al. ....... 342/357.1 |

* cited by examiner

Primary Examiner—Richard M. Camby
(74) Attorney, Agent, or Firm—Sughrue Mion, PLLC

(57) ABSTRACT

A position determination device for a mobile terminal acquires pseudorandom codes and navigation data contained in received signals and associated augmentation data representative of an instantaneous approximate position of the terminal and an associated radius of protection contained in received messages. In the presence of a radius of protection corresponding to a quality level lower than a chosen quality level or in the momentary absence of a radius of protection associated with an approximate position at a time T, an estimated radius of protection is determined as a function of a weighting law applied to a chosen number of earlier radii of protection. An estimated position of the terminal at the time T is then determined as a function of at least the estimated radius of protection and the pseudorandom codes, navigation data and approximate position acquired at the time T.

13 Claims, 1 Drawing Sheet

DEVICE FOR A MOBILE TERMINAL FOR DETERMINING POSITION BY FILTERING INTEGRITY DATA FROM AN AUGMENTATION DEVICE

CROSS-REFERENCE TO RELATED APPLICATIONS

This application is based on French Patent Application No. 03 14 700 filed Dec. 16, 2003, the disclosure of which is hereby incorporated by reference thereto in its entirety, and the priority of which is hereby claimed under 35 U.S.C. § 119.

BACKGROUND OF THE INVENTION

1. Field of the Invention

The field of the invention is that of positioning, to be more precise that of stand-alone position determination devices (such as Global Positioning System (GPS) receivers for example) or integrated position determination devices, for example devices incorporated in mobile terminals.

In the present context, the expression "mobile terminal" means a communication terminal equipped with a position determination device, where applicable one using satellites, such as a mobile telephone, for example, or a personal digital assistant (PDA), where applicable of the type able to communicate.

2. Description of the Prior Art

Positioning methods, for example methods using satellites, comprise two steps executed sequentially in a position determination device (also referred to as a positioning device). This is known in the art.

In a first step, called the acquisition step, the device determines pseudorandom codes that modulate signals coming from satellites that are "in view" and belong to a constellation of positioning satellites and are referenced to a reference time usually called the "system time". In the present context, the expression "constellation of positioning satellites" means a radio navigation satellite service (RNSS) positioning network, such as the GPS network, the GLONASS network or the pending GALILEO network, for example.

The signals received from the satellites that are in view are "compared" to signal replicas based on hypotheses as to the system time and to the timing frequency of the satellites, in order to deduce therefrom the pseudorandom codes modulating said received signals, or in other words to synchronize the clock of the terminal and its frequency to the clock and the frequency of each satellite in view. To this end, correlation measurements are usually effected based on pairs of temporal and frequency hypotheses.

Then, in a second step, the device determines the estimated position of the terminal in which it is installed from the pseudorandom codes acquired and navigation data contained in the signals received in particular. To be more precise, this second step consists in determining from the acquired pseudorandom codes propagation times of the signals between each of the satellites in view and the terminal, then determining, from these propagation times and navigation data contained in the signals, pseudodistances between the terminal and each of the satellites in view, and finally determining the estimated position of the terminal from these pseudodistances.

This latter determination necessitates at least one quadrilateration, and more generally a numerical solution by the least squares method with four unknowns and using at least four measurements (four measurements are necessary for solving the four unknowns). Under certain conditions only three measurements are used and one unknown is fixed, typically the altitude (Z) of the receiver, or hybridization with external measurements may be used.

The accuracy of each propagation time, and thus of each pseudodistance, determines the accuracy of the estimated position directly. Now, the accuracy of each propagation time depends on the quality of the acquisition of the pseudorandom codes from the corresponding received signal, which is dependent on the quality of said received signal.

Consequently, if at least one of the signals received from a satellite in view is of poor quality, which is a relatively frequent occurrence, especially in rough or congested environments or at the edge of a satellite coverage area, the position determined is generally subject to error. It may even happen that it is momentarily impossible to determine the position of the terminal, even though the signals coming from the other satellites in view are of good quality.

To improve on this situation, and in particular to improve the accuracy of the estimated position, it has been proposed to couple the constellations of positioning satellites to systems, known as "augmentation systems", of the satellite-based augmentation system (SBAS) type, such as the EGNOS system, for example.

An augmentation system generally consists of ground stations and geosynchronous satellites (such as IMMARSAT and ARTEMIS, for example) for transmitting, generally by radio, augmentation data to mobile terminals provided with positioning devices.

The augmentation data is generally representative of the approximate reference time of the constellation, the approximate position of the terminal concerned and at least one radius of uncertainty associated with that approximate position. However, it may equally be representative of ephemeredes, complementary navigation data, or temporal corrections, possibly representative of disturbances induced by the ionosphere to the propagation of signals transmitted by the satellites in view.

The augmentation data is essentially used in the step of determining the estimated position and the associated radii of uncertainty, called protection level(s).

The radii of uncertainty constitute integrity data that generally represents an envelope, defined by a horizontal radius and a vertical radius, for example, centered on the associated approximate position, and in which the terminal concerned is deemed to be found.

This envelope, also called the protection radius, is used by the device to estimate its service availability relative to a requested accuracy requirement.

The larger the envelope, the less accurate the estimated position is likely to be. In other words, the radius of protection defines a "level of quality" in terms of potential position accuracy.

The accuracy of the estimated position and the accuracy of the protection radius depending on correction and integrity (or level of quality) information received, the positioning device is therefore dependent on what the augmentation system transmits to it.

Now, under certain conditions, it is essential to have an accuracy higher than that which may be obtained, at a given time, by calculating the position in accordance with the standard cited above.

Furthermore, when the terminal is located in a degraded radio environment or at the edge of a coverage area it cannot receive the augmentation data (typically correction and integrity information), which degrades positioning accuracy and prevents determination of the protection radius and thus leads to unavailability of service.

GPS code filtering techniques have been proposed for taking account of the situations cited above. However, they relate only to fixed terminals, because their convergence times are too long to enable their use in mobile terminals.

GPS phase filtering techniques have also been proposed, but necessitate not only a reference station whose position is known accurately but also permanent visibility of the satellites of the GPS constellation.

Thus an object of the invention is to improve on this situation.

SUMMARY OF THE INVENTION

To this end, the invention proposes a position determination device for a mobile terminal, the device comprising means for acquiring pseudorandom codes and navigation data contained in received signals and associated augmentation data representative of an instantaneous approximate position of the terminal and an associated radius of protection and contained in received messages, position calculation means adapted, in the presence of a radius of protection corresponding to a quality level lower than a chosen quality level or in the momentary absence of a radius of protection, associated with an approximate position at a time T, to determine an estimated radius of protection as a function of a weighting law applied to a chosen number of earlier radii of protection and then to determine an estimated position of the terminal at the time T as a function of at least the estimated radius of protection and the pseudorandom codes, navigation data and approximate position acquired at the time T.

The positioning system may have other features and in particular, alone or in combination:

- a memory adapted to store the earlier radii of protection. In this case, the position calculation means are adapted to compare each quality level corresponding to an acquired radius of protection to the chosen quality level defined by the quality level of the immediately preceding radius of protection stored in the memory (for the time "T-1"). The position calculation means may then be adapted to store in the memory either an acquired radius of protection if the corresponding quality level is greater than or equal to the chosen quality level so that it constitutes an earlier radius of protection or an estimated radius of protection if the quality level of the associated acquired radius of protection is lower than the chosen quality level so that it constitutes an earlier radius of protection. Moreover, each estimated radius of protection may be stored in the memory in corresponding relationship to the corresponding acquired radius of protection,
- the position calculation means may be reconfigurable so that the number of earlier radii of protection used to determine an estimated radius of protection may be modified as required,
- the position calculation means preferably comprise filtering means adapted to apply the weighting law to the earlier radii of protection, for example a linear filter adapted to apply a linear weighting law or a Kalman filter,
- the navigation data may come from a satellite navigation system, for example of the GPS, GLONASS or GALILEO type. In this case, the augmentation data may come from an augmentation system for example of the EGNOS type, coupled to the satellite navigation system.

The invention also proposes a mobile terminal comprising a position determination device as defined hereinabove. The terminal may take the form of a communication terminal. For example, the terminal may communicate within a cellular communications network in which each cell is managed by a base transceiver station (BTS) and the approximate position of the terminal is representative of the cell in which it is located.

The invention is particularly suitable, although not exclusively so, for positioning systems using satellites, and additionally for all positioning methods using the protection radius concept by way of integrity data.

Other features and advantages of the invention will become apparent in the course of the following detailed description and from the appended drawings.

DETAILED DESCRIPTION OF THE PREFERRED EMBODIMENT

The appended drawings constitute part of the description of the invention and may, if necessary, contribute to the definition of the invention.

An object of the invention is to determine the estimated position of a mobile terminal within a telecommunication installation with improved accuracy, especially in a degraded environment or at the edge of a coverage area.

In the present context, the expression "telecommunication installation" means an installation comprising at least one communication network communicating with mobile terminals, a positioning system, for example a satellite positioning network, and an "augmentation" (or assistance) system coupled to the positioning system and broadcasting augmentation data facilitating calculation of the estimated positions of the terminals by the positioning devices (which in this instance are installed in the mobile terminals).

Furthermore, in the present context, the expression "mobile terminal" means any type of terminal capable of receiving at least signals containing navigation data from the satellite positioning network and augmentation data from the augmentation system. Thus they may be simple satellite positioning devices that are portable or installed in a sea, air or land vehicle and implement at least one positioning-related application, or mobile telephones, personal digital assistants (PDAs) or portable computers equipped with a satellite positioning device and also implementing at least one positioning-related application.

Furthermore, in the present context, the expression "satellite positioning system" means a radio navigation satellite system (RNSS) type satellite positioning network, such as the GPS network, for example. However, it could refer to any other type of RNSS network, such as the GLONASS network or the pending GALILEO network, for example, or a combination of at least two of the three networks cited above.

Finally, in the present context, the expression "augmentation system" means a system coupled to the satellite positioning network and broadcasting to mobile terminals (to be more precise, to their positioning devices) augmentation data such as error corrections and integrity data for the associated corrections. For example, this means a satellite based augmentation system (SBAS), such as the EGNOS system referred to in the introduction, for example. This kind of system generally comprises geosynchronous satellites (SG) for broadcasting to mobile terminals SBAS frames containing augmentation data and generated by at least one ground station (SA). However, any other type of augmentation system may be envisaged, whether local or accessible via the Internet.

Figure 1:
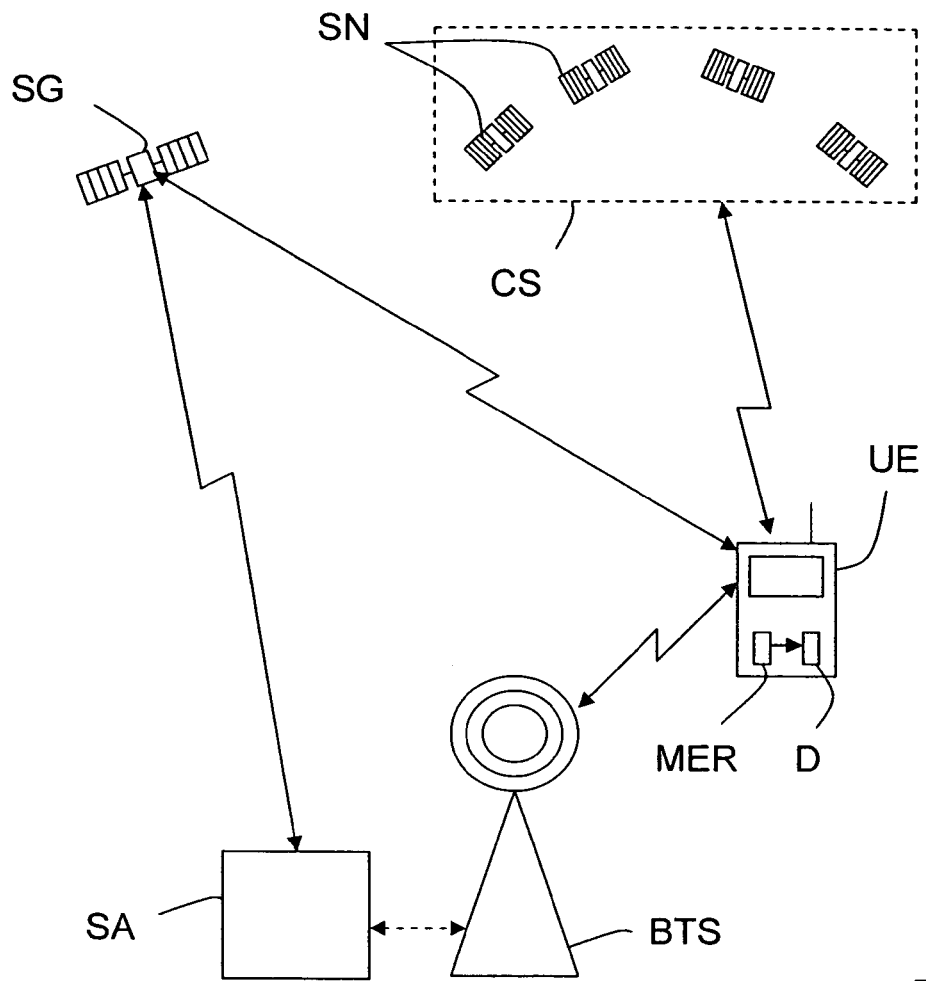
FIG. 1 is a diagram showing one embodiment of a telecommunication installation in which the invention may be implemented.

In the following description, by way of example, and as shown in FIG. 1, the telecommunication installation comprises a mobile (radio) communication network represented by one of its base transceiver stations BTS, a GPS type satellite positioning network represented by its constellation CS of satellites SN, and an EGNOS type augmentation system represented by a geosynchronous satellite SG and an augmentation ground station SA coupled to the communication network. Here the mobile communication network is a cellular network, such as a GSM/GPRS or UMTS network, for example, and all equivalents thereof.

Of course, the installation could be of the hybrid type, i.e. one comprising one or more transmitter stations, one or more telecommunication satellites, and terrestrial repeaters installed at chosen points of the network.

In the following description, also by way of illustrative example, the mobile terminals are mobile telephones UE able to communicate with the cellular network and in particular with its base transceiver stations BTS by means of a transceiver MER and able to communicate with the satellite positioning network CS and the augmentation system (SG, SA) by means of a satellite positioning device D, here of the GPS type, and referred to hereinafter as the device D.

Of course, if the device D is dedicated exclusively to positioning and is not part of a mobile terminal UE, it is provided with a transceiver MER.

The configuration of the telecommunication installation and its overall mode of operation being entirely conventional, they are not described in detail. The invention relates in fact to the mode of operation of the device D. The operation of the satellite navigation system CS and the operation of the augmentation system SG and SA, here of the SBAS type, therefore remain unchanged compared to the prior art.

In order to improve the quality (accuracy, integrity, continuity and availability) of the position determined by the devices D, SBAS augmentation messages broadcast to the mobile terminals UE contain correction and integrity data for correcting data, in particular navigation data, supplied by the positioning satellites SN of the constellation CS.

To be more precise, this SBAS data is generally used to correct errors of temporal synchronization between navigation satellites SN and/or ephemeredes errors and/or propagation errors.

Moreover, the SBAS data may also contain information relating to the integrity of the navigation data coming from the constellation CS, complementary navigation data, such as numbers of PRN in view, for example, ephemeredes, such as those of the positioning satellites SN in view from the mobile telephone UE concerned, for example, and clock corrections, such as time corrections representative of the time difference between the GPS time and the clock of the device D of the mobile telephone UE concerned and/or representative of disturbances caused by the ionosphere, for example, to the propagation of the signals transmitted by the positioning satellites SN in view from the mobile telephone UE concerned.

The positioning satellites SN of the constellation CS have clocks that are synchronized with each other so that the constellation CS has a reference time also called the system time (here called the GPS time).

Moreover, each positioning satellite SN is adapted to transmit spread spectra in the form of multiple access phase-modulated signals in the L band referenced to the GPS time. For example, the signals are modulated and coded in accordance with the W-CDMA technique. This type of modulation being well known to the person skilled in the art, it is not described in detail. Suffice to say that the carrier in the L (or other) band is spread-spectrum BPSK modulated using a binary code obtained from the modulo 2 sum of a pseudorandom code chosen from a list of mutually orthogonal spreading codes, such as the Gold codes, for example.

In the case of the GPS, each positioning satellite SN transmits signals in the L1 band (1575.42 MHz) modulated by two pseudorandom codes known as coarse acquisition (C/A) codes and P codes (also known as Y codes if they are encrypted), as well as, usually, signals in the L2 band (1277.6 MHz) modulated by a pseudorandom code Y.

The modulated signals also contain navigation data, such as the GPS time of the constellation CS, for example, their transmission time, and the ephemeredes of the positioning satellite SN that sent them.

Thus the object of a device D is firstly to synchronize to the signals that it receives from the positioning satellites SN in view, in order to be able to determine the propagation time of each received signal between the satellite SN concerned and the mobile telephone UE in which it is installed, then navigation data contained in those signals and augmentation data contained in frames broadcast by the augmentation system (SA, SG), and finally the estimated position of said mobile telephone UE.

Figure 2:
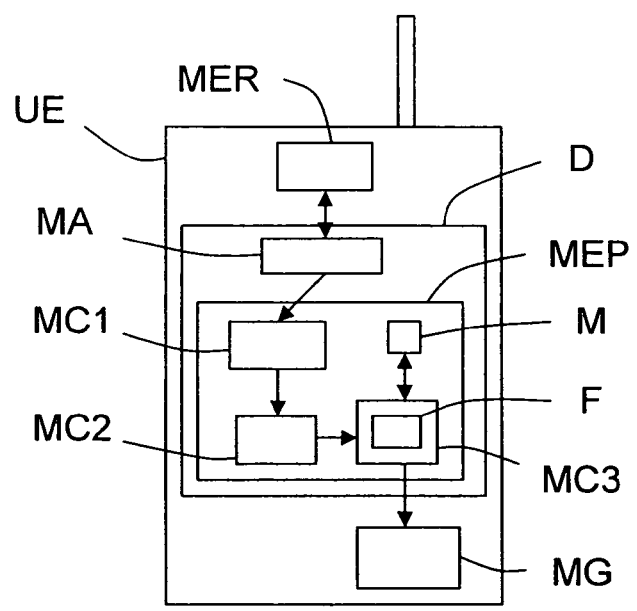
FIG. 2 is a diagram showing one embodiment of a mobile communication terminal equipped with a positioning device of the invention.

To this end, and as indicated in the introduction, the device D executes a step of pseudorandom code acquisition and a step of estimated position determination. As shown in FIG. 2, the device D comprises an acquisition module MA coupled to the transceiver module MER and responsible for executing the acquisition step and a position estimation module MEP coupled to the acquisition module MA and responsible for executing the estimated position determination step.

The invention relates primarily to the estimated position determination step and thus to only the position estimation module MEP. The acquisition module MA is entirely conventional and is therefore not described in detail.

The acquisition module MA generally takes the form of an acquisition card dedicated to analyzing the signals received by the transceiver module MER, to be more precise signals (in the L band in the case of the GPS) coming from the constellation CS, and SBAS frames containing the augmentation data coming from the augmentation system (SG, SA), with a view to acquisition of the pseudorandom codes. For example, the card MA is locked to the transmission frequencies L1 and L2 of the positioning satellites SN. The transmission frequency of the geosynchronous satellite SG of the augmentation system is usually the frequency L1.

The card MA constitutes pairs of time/frequency hypotheses on the effective GPS time and its effective position from the approximate GPS time and its approximate position contained in the received augmentation data. It then determines for each pair of hypotheses, firstly, estimated absolute positions of the satellites SN of the constellation CS and, secondly, estimated distances between the mobile telephone UE and each of the positioning satellites SN in view, based on the estimated positions of the constellation in view. It also determines for each pair of hypotheses the Doppler effect associated with each of the positioning satellites SN in view, given their approximate position and distance from the mobile telephone UE.

The card MA then deduces from the above the GPS times and the position of the mobile telephone UE that are the most probable, enabling it to synchronize on each signal received from a satellite SN in view in order to determine the pseudorandom codes used to modulate that signal. Once the pseudorandom codes have been determined, and therefore once synchronization to the pseudorandom codes has been effected, the step of determining the estimated position may commence.

To execute this second step the position estimation module MEP of the device D comprises three coupled calculation modules MC1 to MC3, for example.

The first calculation module MC1 determines for each demodulated signal its propagation time between the satellite SN in view that sent it and the mobile telephone UE (to be more precise its device D). To do this, it uses the signal sending time incorporated into said signal by the satellite that sent it and the reception time associated with the signal by the transceiver module MER when the signal is received.

The second calculation module MC2 determines the pseudodistance between the mobile telephone UE and the corresponding satellite SN in view from navigation data contained in each signal and additional navigation data contained in the SBAS messages received from the augmentation system (SG, SA) and the associated propagation time.

To be more precise, the second calculation module MC2 uses the additional navigation data and in particular the correction data to correct the navigation data transmitted in the L band signals by the satellites SN in view before using it to determine the pseudodistances associated with each satellite SN in view.

These pseudodistances are fed to the third calculation module MC3, which determines the estimated position of the mobile telephone UE.

To be more precise, from the pseudodistances (of which there are generally four (4)), certain corrected navigation data and the approximate position and the associated radius of protection, the third calculation module MC3 determines the estimated position by quadrilateration at least and more generally by a numerical solution of the least squares method type for four unknowns and using at least four measurements.

According to the invention, when the protection radius (integrity data) associated with an approximate position at a time T corresponds to a quality level that is below a chosen quality level, or if the radius of protection is momentarily unavailable, the third calculation module MC3 determines an estimated radius of protection.

The above situations generally arise in rough or congested environments or at the edge of the coverage area of the augmentation system.

In these situations, the radius of protection received (or acquired) does not correspond to the earlier radii of protection (associated with the times T-1, T-2, T-3, etc.). In fact it corresponds to a lower quality level, or in other words to a larger position uncertainty envelope. For example, the earlier approximate positions were associated with envelopes of 2 to 3 meters radius, while the current approximate position (at time T) is associated with an envelope of one kilometer radius.

In the presence of this kind of variation of the radius of protection, the third calculation module MC3 requires much more time for its calculation to converge toward an accurate estimated position. Furthermore, the accuracy of the estimated position is highly likely to be worse than that of previous ones.

According to the invention, the third calculation module MC3 determines each estimated radius of protection as a function of a weighting law that is applied to a chosen number of earlier radii of protection. In other words, the third calculation module MC3 extrapolates the estimated radius of protection as a function of one or more earlier radii of protection. The augmentation data consisting of the transmitted radius of protection is thus no longer used only as a parameter for correcting the estimated position, but also as a filtering parameter and/or a parameter for generating the radius protection appropriate to the required accuracy.

In the present context, the expression "earlier radii of protection" means radii of protection used previously by the third calculation module MC3 to determine earlier estimated positions. These may therefore be either received (or acquired) radii of protection or estimated radii of protection. These earlier radii of protection are preferably stored in a memory M at the initiative of the third calculation module MC3. The memory M may be part of the third calculation module MC3.

The weighting law is preferably applied by a filter F of the third calculation module MC3. Any type of filtering may be envisaged. For example, the filter F may be a linear filter, applying a linear weighting law, or a Kalman filter, well known to the person skilled in the art.

The third calculation module MC3 is preferably reconfigurable so that the number of earlier radii of protection which are used to determine an estimated radius of protection may be modified as required. For example, the user may choose from a menu on his mobile telephone UE the number of earlier radii of protection (or samples) to be used by the filter F.

To determine if the current radius of protection corresponds to a quality level lower than the chosen quality level, the third calculation module MC3 preferably effects a comparison.

The chosen quality level may be either fixed by the user, for example selected in a menu on his mobile telephone UE, or determined by the third calculation module MC3, for example as a function of the quality level corresponding to the immediately preceding radius of protection (at time T-1). In this latter case, for example, the third calculation module MC3 may choose the quality level that corresponds to the earlier radius of protection, which is stored in the memory M. The latter is either the received (or acquired) radius of protection, if its quality level was greater than the quality level chosen from the comparison, or the estimated radius of protection, if the quality level of the received radius of protection was lower than the quality level chosen for the comparison.

Having the third calculation module MC3 store each estimated radius of protection in the memory M in corresponding relationship to the corresponding received (or acquired) radius of protection may be envisaged. This may enable it to choose the radii of protection to which it applies the weighting law, according to its configuration.

When the third calculation module MC3 has effected its comparison, two outcomes have to be envisaged.

If the quality level of the received radius of protection is greater than or equal to the chosen quality level, the third calculation module MC3 preferably uses the received radius of protection and the received approximate position that is associated with it to determine the estimated position of the mobile telephone UE in the conventional way known to the person skilled in the art.

On the other hand, if the quality level of the received radius of protection is lower than the chosen quality level, the third calculation module MC3 uses the estimated radius of protection and the received approximate position that is associated with it to determine the estimated position of the mobile telephone UE in the conventional manner known to the person skilled in the art.

The output of the third calculation module MC3 feeds the management module MG of the mobile telephone UE with estimated positions.

The positioning device D of the invention, and in particular its acquisition module and its position estimation module MEP, may take the form of electronic circuits, software (or electronic data processing) modules, or a combination of circuits and software, for example.

The invention is particularly suitable for mobile terminals typically moving at speeds of less than around 70 kph. This is because a machine traveling at high speed is assumed to be in an uncluttered environment, so that the accuracy of its position may be low, whereas a vehicle that is moving at a very low speed is assumed to be in a congested environment, so that the accuracy of its position must be high (this is the case with large ships, for example, especially in ports or in "roads" with a high traffic density).

The invention enables determination of position with substantially constant accuracy in the absence of what the person skilled in the art calls "permanent phase visibility", and consequently offers very accurate position determination with much faster convergence than is offered by earlier positioning devices. This is the case with applications in the field of geodesy in particular. In this field, obtaining a final geodesic measurement usually necessitates collection of intermediate geodesic measurements over approximately 24 hours, in order to eliminate aberrant values through long-term averaging, whereas with the invention the collection time may be very significantly reduced since only measurements of high accuracy are taken into account in the averaging calculations.

Moreover, the invention relates only to the positioning devices and not to the network infrastructures, and its implementation is compatible with the operation of existing positioning and augmentation systems.

The invention is not limited to the embodiments of a positioning device and a mobile terminal described hereinabove by way of example only, but encompasses all variants that the person skilled in the art might envisage that fall within the scope of the following claims.

Thus there has been described hereinabove an installation in which the telecommunication network is a GSM/GPRS or UMTS cellular network. However, the invention relates equally to telecommunication radio networks of the hybrid satellite type with terrestrial repeaters.

There is claimed:

1. A position determination device for a mobile terminal, said device comprising means for acquiring pseudorandom codes and navigation data contained in received signals and associated augmentation data representative of an instantaneous approximate position of said terminal and an associated radius of protection and contained in received messages, position calculation means adapted, in the presence of a radius of protection corresponding to a quality level lower than a chosen quality level or in the momentary absence of a radius of protection, associated with an approximate position at a time T, to determine an estimated radius of protection as a function of a weighting law applied to a chosen number of earlier radii of protection and then to determine an estimated position of said terminal at said time T as a function of at least said estimated radius of protection and said pseudorandom codes, navigation data and approximate position acquired at said time T.

2. The device claimed in claim 1 further comprising a memory adapted to store said earlier radii of protection and wherein said position calculation means are adapted to compare each quality level corresponding to an acquired radius of protection to said chosen quality level defined by the quality level of the immediately preceding radius of protection stored in said memory.

3. The device claimed in claim 2 wherein said position calculation means are adapted to store in said memory either an acquired radius of protection if the corresponding quality level is greater than or equal to said chosen quality level so that it constitutes an earlier radius of protection or an estimated radius of protection if said quality level of the associated acquired radius of protection is lower than said chosen quality level so that it constitutes an earlier radius of protection.

4. The device claimed in claim 2 wherein each estimated radius of protection is stored in said memory in corresponding relationship to the corresponding acquired radius of protection.

5. The device claimed in claim 1 wherein said position calculation means are adapted to modify on command the number of earlier radii of protection used to determine an estimated radius of protection.

6. The device claimed in claim 1 wherein said position calculation means comprise filtering means adapted to apply said weighting law to said earlier radii of protection.

7. The device claimed in claim 6 wherein said filtering means constitute a linear filter adapted to apply a linear weighting law.

8. The device claimed in claim 6 wherein said filtering means constitute a Kalman filter.

9. The device claimed in claim 1 wherein said navigation data comes from a satellite navigation system.

10. The device claimed in claim 9 wherein said augmentation data comes from an augmentation system coupled to said satellite navigation system.

11. A mobile terminal comprising a position determination device as claimed in claim 10.

12. The terminal claimed in claim 11 constituting a communication terminal.

13. The terminal claimed in claim 12 adapted to communicate within a cellular communications network in which each cell is managed by a base transceiver station and said approximate position is representative of the cell in which it is located.

* * * * *